(12) United States Patent
Anders

(10) Patent No.: US 6,179,537 B1
(45) Date of Patent: Jan. 30, 2001

(54) CLAMPING SCREW

(75) Inventor: Cameron F. Anders, Webster, NY (US)

(73) Assignee: The Gleason Works, Rochester, NY (US)

( * ) Notice: Under 35 U.S.C. 154(b), the term of this patent shall be extended for 0 days.

(21) Appl. No.: 09/439,546

(22) Filed: Nov. 12, 1999

(51) Int. Cl.$^7$ .............................. F16B 35/00; F16B 35/02
(52) U.S. Cl. ...................... 411/392; 411/348; 411/383; 411/393
(58) Field of Search ................................... 411/348, 383, 411/384, 392, 393

(56) References Cited

U.S. PATENT DOCUMENTS

| | | | |
|---|---|---|---|
| 3,052,940 | * 9/1962 | Sellers | 411/348 X |
| 3,130,994 | * 4/1964 | Balducci | 411/393 X |
| 4,197,038 | 4/1980 | Hipp et al. . | |
| 4,268,194 | 5/1981 | Bloink et al. . | |
| 4,530,623 | 7/1985 | Kotthaus . | |
| 4,621,954 | 11/1986 | Kitchen et al. . | |
| 4,796,581 | * 1/1989 | Bruhmann | 411/393 X |
| 4,930,371 | * 6/1990 | Schneider | 411/393 X |
| 5,890,846 | 4/1999 | Clark et al. . | |

* cited by examiner

Primary Examiner—Neill Wilson
(74) Attorney, Agent, or Firm—Robert L. McDowell

(57) ABSTRACT

A clamping screw comprising a main body portion generally cylindrical in shape and having a length extending between a first end and a second end and an axis of rotation extending in the direction of the length. The main body portion comprises an outer surface having threads arranged along at least a portion of the length and an inner bore defining an opening at the second end of the main body portion. The clamping screw includes a head portion comprising a contacting surface, with the head portion being positioned adjacent the second end of the main body portion and being axially movable relative to the main body portion. A spring is provided to urge the head portion away from the main body portion in an axial direction. In a preferred embodiment, the inner bore extends along the entire length of the main body portion defining a first opening and a second opening at the respective ends of the main body portion. Releasably secured to the clamping head is a plunger that is axially movable within the inner bore and through the second end between a compressed position and an extended position. A spring engaging the plunger is included for providing a force to urge the plunger and clamping head away from the main body portion in an axial direction toward the extended position. Stop means is located within the inner bore at a location between the first end and the second end for providing a stationary contact surface for the resilient means.

16 Claims, 4 Drawing Sheets

CLAMPING SCREW

FIELD OF THE INVENTION

The present invention is directed to clamping screws and in particular to clamping screws for securing cutting blades in position in cutting tools utilized in the manufacture of gears and the like.

BACKGROUND OF THE INVENTION

In cutting operations, such as milling or hobbing processes to produce gears, it is known to utilize cutting tools wherein one or more cutting blades are positioned in and project from a cutter head. See, for example, U.S. Pat. Nos. 4,621,954 to Kitchen et al. or 5,890,846 to Clark et al.

Cutting blades are usually secured in position in a cutter head by one or more clamping screws. The clamping screws may be in direct contact with the cutting blades such as shown in U.S. Pat. Nos. 4,268,194 to Bloink et al. or 4,530,623 to Kotthaus. In other instances, clamping screws may contact a clamp block which in turn contacts a cutting blade as can be seen, for example, in the previously mentioned U.S. Pat. Nos. 4,621,954 or 5,890,846. With the clamp block arrangement, clamping forces can be spread out along the blade-clamp block interface instead of the point contact that occurs with direct contact between the clamp screw and cutting blade.

In either of the clamping arrangements discussed above or in other similar arrangements, loosening of one or more clamp screws (such as is done after sharpening in order to reposition a cutting blade to a proper height above the face of a cutter head) may result in a cutting blade becoming unstable in the cutter head. Once contact between the clamp screw (or the clamp block) and the cutting blade is lost, the cutting blade is free to move. Even after a cutting blade is correctly positioned in a cutter head, there is nothing to ensure the correct position will be maintained prior to contact by a clamp screw or clamp block. Thus, the slightest force introduced to the cutting blade or cutter head prior to contact may result in the cutting blade being moved to an undesired position and to the subsequent formation of a geometrically incorrect tooth surface on a gear.

One manner set forth to alleviate the above problem of unstable cutting blades in the unclamped position is disclosed in U.S. Pat. No. 4,197,038 to Hipp et al. wherein pretensioning elements are utilized to maintain position of a cutting blade prior to clamping. The pretensioning elements comprise a generally bracket-shaped (]) pressure member which is positioned adjacent a cutting blade. The pressure member is acted upon either by a spring-loaded stud or a profiled spring to apply an amount of force to the cutting blade to hold the cutting blade in position until clamped but yet allow the cutting blade to be axially repositioned in the cutter head as necessary.

A drawback of the above pretensioning arrangement is that it creates additional elements that must reside in the cutter head since in addition to clamp screws, a pressure member and a force providing member are also required. This not only results in a more complicated cutting tool, but it increases production costs and slows cutting tool assembly time.

It is an object of the present invention to provide a clamping screw that not only clamps a cutting blade in position in a cutter head but also serves to hold cutting blades in a pre-clamped position whereby a small force is provided by the clamp screw to hold the cutting blade against its reference surfaces in the cutter head. In the pre-clamped position, the cutting blade may be displaced linearly to its proper position in the cutter head.

SUMMARY OF THE INVENTION

The present invention is directed to a clamping screw comprising a main body portion being generally cylindrical in shape and having a length extending between a first end and a second end and an axis of rotation extending in the direction of the length. The main body portion further comprises an outer surface having threads arranged along at least a portion of the length and an inner bore defining an opening at the second end of the main body portion.

The clamping screw includes a head portion comprising a contacting surface, with the head portion being positioned adjacent the second end of the main body portion and being axially movable relative to the main body portion. Resilient means, such as a spring, are provided to urge the head portion away from the main body portion in an axial direction. The outer surface proximate the second end of the main body portion is smooth and slidably engaged with an inner surface of a bore formed in the head portion. The outer surface proximate the second end preferably comprises a diameter less than the diameter of the outer surface comprising threads.

In a preferred embodiment, the clamping screw of the present invention comprises a main body portion being generally cylindrical in shape and having a length extending between a first end and a second end and an axis of rotation extending in the direction of the length. The main body portion further comprises an outer surface and an inner bore extending along the length with the outer surface comprising threads arranged along at least a portion of the length. The inner bore defines a first opening at the first end of the main body portion and a second opening at the second end of the main body portion.

The preferred inventive clamping screw includes a clamping head comprising a contacting surface. The clamping head is positioned adjacent the second end of the main body portion and is axially movable relative to the main body portion between a compressed position and an extended position. Releasably secured to the clamping head is a plunger that is axially movable within the inner bore and through the second end between a compressed position and an extended position. Resilient means engaging the plunger is included for providing a force to urge the plunger and clamping head away from the main body portion in an axial direction toward the extended position. A stop means is located within the inner bore at a location between the first end and the second end for providing a stationary contact surface for engagement by the resilient means.

DETAILED DESCRIPTION OF THE PREFERRED EMBODIMENT

Figure 1:
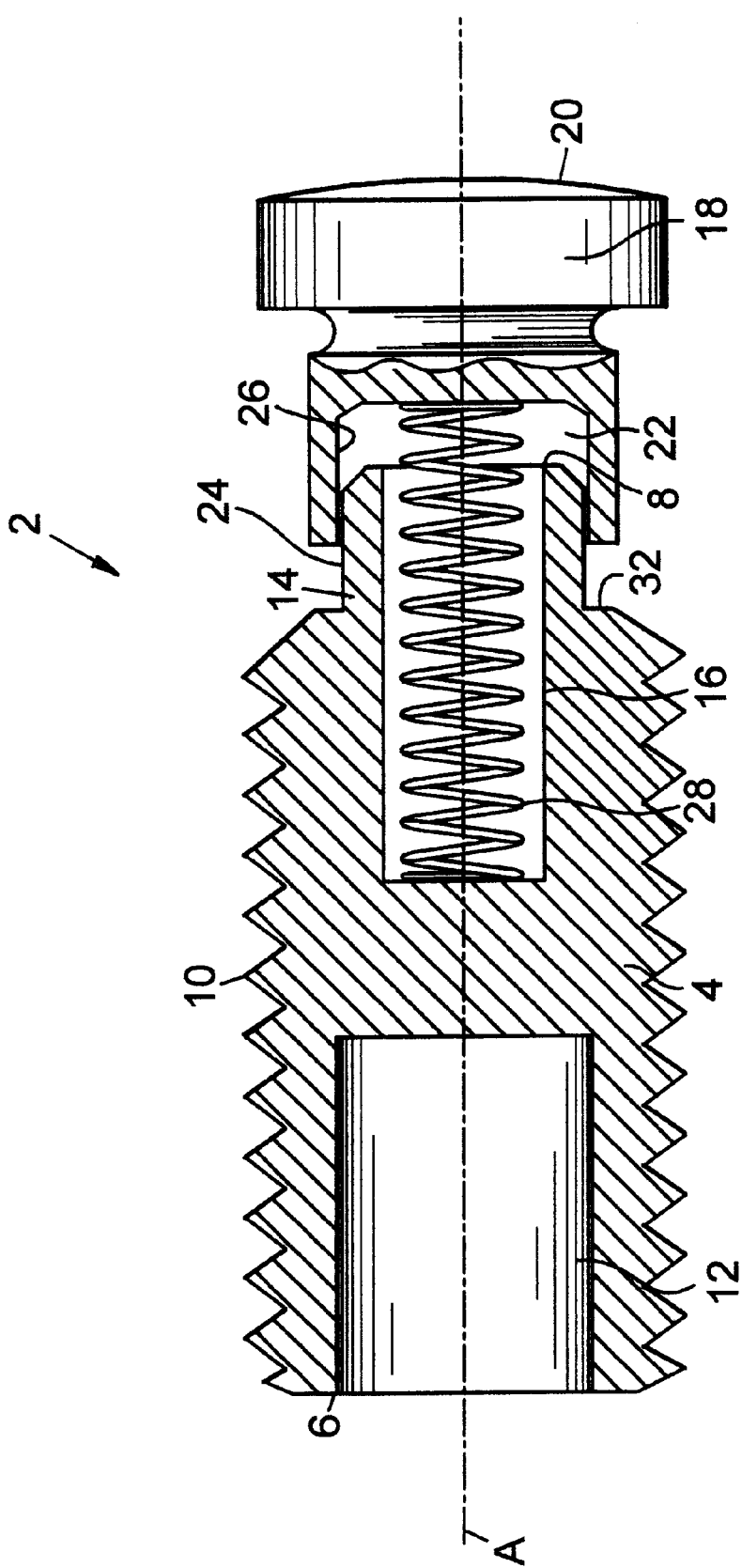
FIG. 1 illustrates an axial side view of an extended clamp screw according to a first embodiment of the present invention.

The present invention will now be discussed in detail with reference to the preferred embodiment and the accompanying drawings. In the drawings, like components will be referenced using the same reference numbers.

FIG. 1 illustrates a first embodiment of the present invention wherein a clamp screw 2 comprises a generally cylindrical shaped main body portion 4 rotatable about an axis A and having a first end 6 and a second end 8 with threads 10 arranged about at least a portion of the length of the main body portion 4. The first end 6 includes an inner bore 12 that defines an opening at the first end 6 and extends into the main body portion 4. The inner bore 6 is internally configured (e.g. a drive socket) such that a complementary shaped tool (e.g. a torque wrench) may fit thereinto for advancing and/or retracting the clamp screw 2 in a cutter head.

The main body portion 4 includes a neck portion 14 the outer end of which defines the second end 8. The second end 8 includes an inner bore 16 that defines an opening at the second end 8 and extends into the main body portion 4.

Clamp screw 2 further includes a head portion 18 located adjacent the second end 8. Head portion 18 is axially movable with respect to main body portion 4 and comprises a contact surface 20 and an inner bore 22. The diameter of the inner bore 22 is sized such that the outer surface 24 of neck portion 14 may slidably engage the inner surface 26 of bore 22. A resilient means such as spring 28 is positioned in inner bore 16 and extends into inner bore 22 when head portion 18 is engaged with neck portion 14. Spring 28 provides the resilient force necessary to urge head portion 18 axially away from the main body portion 4.

For informational purposes, movement of a cutting blade positioned in a cutter head is usually in its lengthwise direction so as to adjust the height of the cutting blade with respect to the cutter head. Adjustments of this type are usually made in response to assembly of a cutting tool or in the case of cutting blades having been sharpened whereby, with profile sharpened blades, the length is reduced by sharpening. In either instance, the cutting blades must be positioned in the lengthwise direction to attain the proper height with respect to the cutter head. Movement of the cutting blade may be effected either manually or by mechanical or computer controlled means as is known in the art.

In use, as clamp screw 2 is advanced into a cutter head, head portion 18 will be in an extended position axially spaced from the main body portion 4 due to the influence of spring 28. As the contact surface 20 engages a cutting blade, spring 28 will undergo compression thus exerting force on the on the head portion 18 and also on the cutting blade. The force exerted is small as all that is needed is enough force to maintain contact between the cutting blade and the reference surfaces of a cutter head while still allowing the cutting blade to be moved easily and controllably along its lengthwise direction to a proper position in the cutter head. Of course, the skilled artisan will recognize that the size and strength of the spring 28 will depend on the particular application, e.g. size of cutting tool, weight of cutting blade, etc.

As clamp screw 2 continues to advance, the distance decreases between end face 30 of head portion 18 and shoulder 32 of the main body portion 4 until these surfaces come into contact. Once contact occurs, the inventive clamp screw effectively becomes a solid clamp screw and the full clamping force of the clamp screw is transmitted to the cutting blade. Upon loosening of the clamp screw and the accompanying separation of the head portion 18 from direct contact with the main body portion 4, contact between the surface 20 and the cutting blade will be solely due to the force exerted by the spring 28. Thus, positioning of the cutting blade may be easily and controllably carried out.

Figure 2:
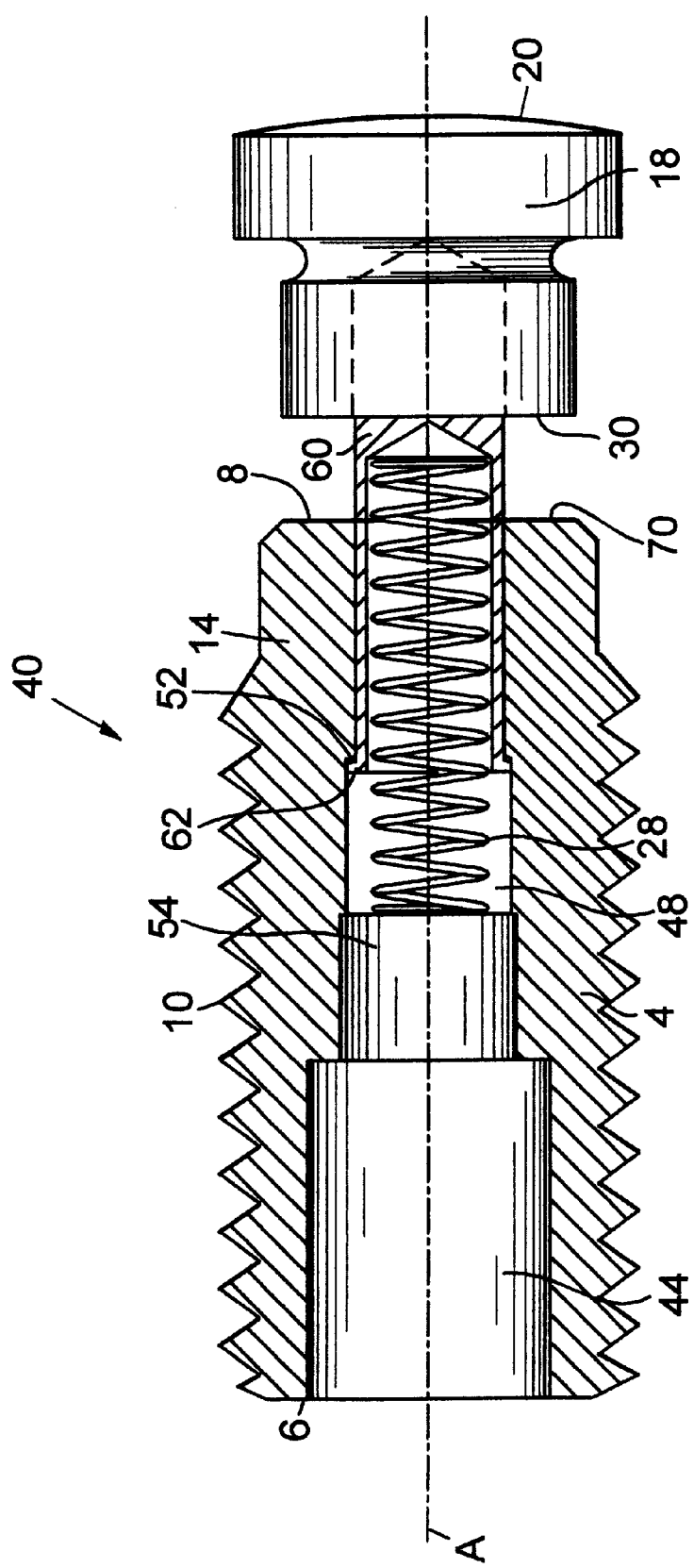
FIG. 2 illustrates a partial axial cross-sectional view of an extended clamp screw according to a preferred embodiment of the present invention.
Figure 3:
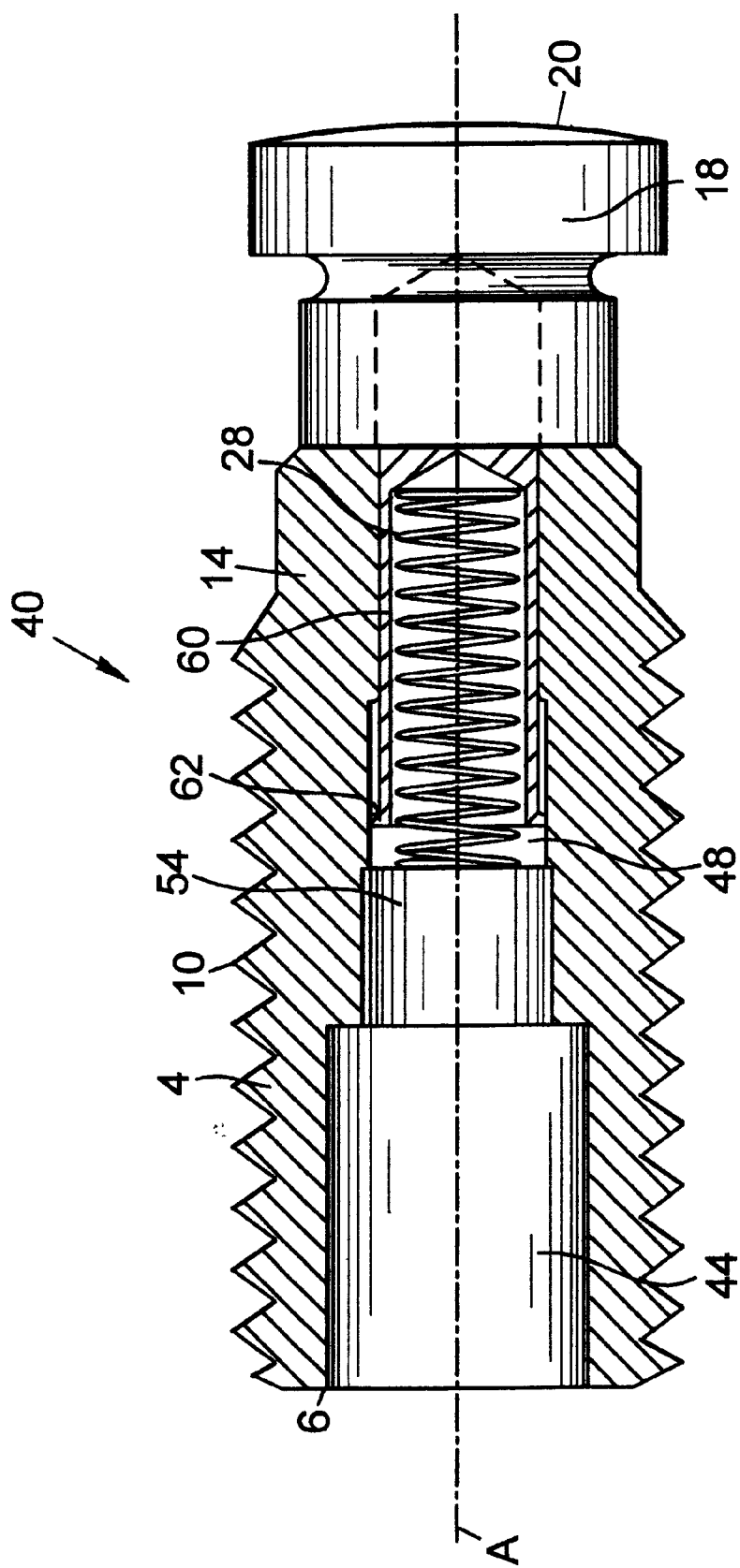
FIG. 3 illustrates a partial axial cross-sectional view of a compressed clamp screw according to a preferred embodiment of the present invention.

FIGS. 2–6 illustrate a preferred embodiment of the present invention. FIG. 2, illustrates clamp screw 40 in an extended condition while FIG. 3 shows clamp screw 40 in a compressed condition.

As with the clamp screw 2 shown in FIG. 1, clamp screw 40 of FIGS. 2 or 3 comprises a generally cylindrical main body portion 4 rotatable about an axis A, a first end 6 and a second end 8 with threads 10 arranged about at least a portion of the length of the main body portion 4. Clamp screw 40 further includes a head portion 18 having contact surface 20 and a spring 28 to urge the head portion 18 in an axial direction away from the main body portion 4.

Figure 4:
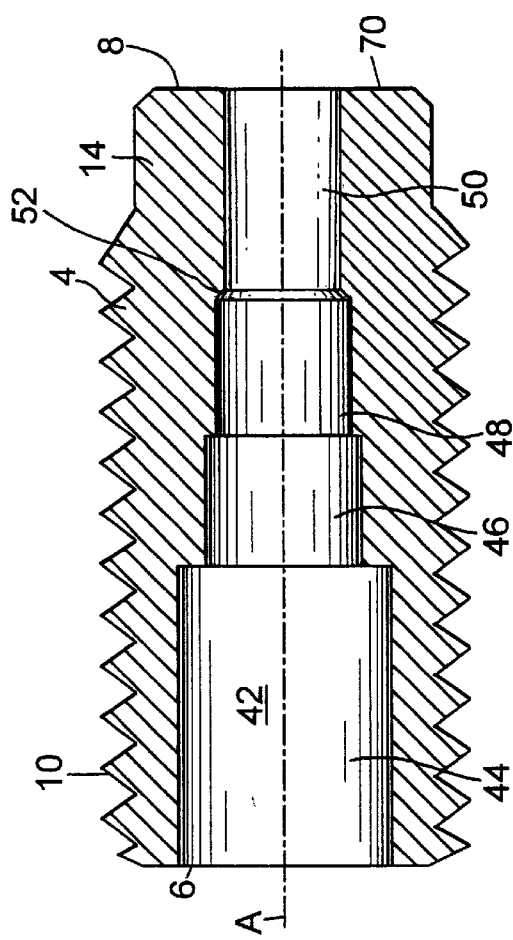
FIG. 4 shows an axial side view of a main body portion of a clamp screw according to a preferred embodiment of the present invention.

FIG. 4 illustrates the main body portion 10 of clamp screw 40. The main body portion 10 comprises an inner bore 42 extending axially through the main body portion 10 between first end 6 and second end 8 and forming an opening at each of the ends. Inner bore 42 is divided into sections 44, 46, 48 and 50 of differing diameters which will be discussed in detail below.

Clamp screw 40 further includes a plunger 60 (see FIG. 5) which is inserted into the opening at the first end 6 of main body portion 10. Plunger 60 is generally cylindrical and comprises a flanged first end 62, a second end 64 and an inner bore 66 extending from the flanged end 62 into the plunger and terminating axially inward of the second end 64. Threads 68 are located on the outer surface of plunger 60 adjacent the second end 64.

As stated above, plunger 60 is inserted into the opening at the first end 6 of the main body portion 10. The diameter of plunger 60 is such that the plunger may pass through all sections of the inner bore 42 (and thus through the opening at end 8) with the movement of plunger 60 being stopped due to contact between flanged end 62 and inner shoulder 52 at the juncture of sections 48 and 50 (see FIG. 2).

Once plunger 60 is inserted through the opening at first end 6, spring 28 is also inserted through the same opening and into the plunger inner bore 66. A press-fit plug or setscrew 54 is then secured in section 46. Section 46 may include inner threads if a setscrew is utilized in place of a press-fit plug. However, a press-fit plug is preferred. With the press-fit plug 54 in place, plunger 60 will reside partly in section 50 of inner bore 42 with the second end 64 and threads 68 of plunger 60 extending out through the opening at the second end 8 of the main body portion 10. This is due to the action of the spring 28 reacting against the press-fit plug 54 (FIG. 2). Thus it can be seen that the axial movement of plunger flange 62 is confined to section 48 of main body inner bore 42. Section 44 of inner bore 42 may be internally configured such that a complementary shaped tool (e.g. a wrench) may fit thereinto for advancing and/or retracting the clamp screw 40 in a cutter head.

Figure 6:
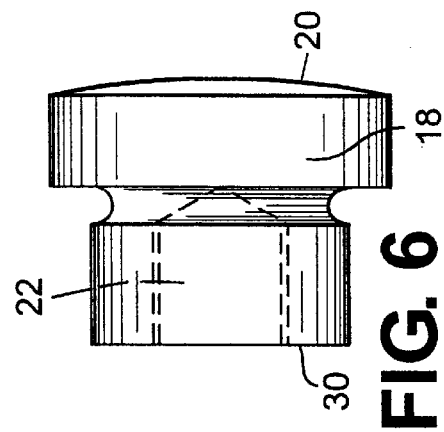
FIG. 6 shows an axial side view of a head portion of a clamp screw according to a preferred embodiment of the present invention.
Figure 5:
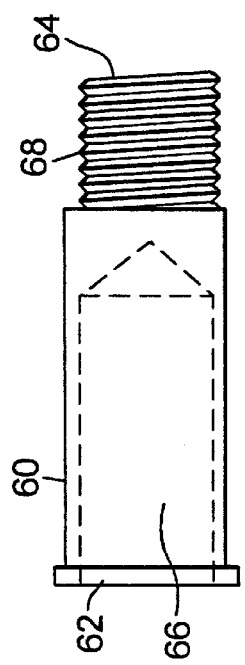
FIG. 5 shows an axial side view of a plunger of a clamp screw according to a preferred embodiment of the present invention.

Head portion 18 of FIG. 6 is secured to plunger 60 via threads located in inner bore 22 engaging threads 68 on the plunger (see FIGS. 2 or 3). A thread-locking compound is preferably used on the threads 68 to prevent loosening of head 18. The thread-locking compound preferably being of the anaerobic type.

Operation of the preferred embodiment is as follows. As clamp screw 40 is advanced into a cutter head, head portion 18 will be in an extended position (FIG. 2) axially spaced from the main body portion 4 due to the influence of spring 28. In this condition, plunger 60 is axially advanced the maximum amount with respect to press-fit plug 54 such that flange 62 is engaged with inner shoulder 52.

As the contact surface 20 engages a cutting blade, head portion 18 and plunger 60 will move toward press-fit plug 54 causing spring 28 to undergo compression thus exerting force on the on the press-fit plug 54 and also on the cutting blade. The force exerted is small as all that is needed is enough force to maintain contact between the cutting blade and the reference surfaces of a cutter head while still allowing the cutting blade to be moved easily and controllably along its lengthwise direction to a proper position in the cutter head. Again, the skilled artisan will recognize that the size and strength of the spring 28 will depend on the particular application, e.g. size of cutting tool, weight of cutting blade, etc.

As clamp screw 40 continues to advance, the distance decreases between end face 30 of head portion 18 and second end face 70 of the main body portion 4 until these surfaces come into contact. It can be clearly seen, of course, that the length of plunger 60 must be limited such that there is no contact between flange 62 and press-fit plug 54 upon compression of spring 28. Contact must occur between end faces 30 and 70. Once contact occurs, the inventive clamp screw effectively becomes a solid clamp screw (FIG. 3) and the full clamping force of the clamp screw is transmitted to the cutting blade. Upon loosening of the clamp screw and the accompanying separation of the head portion 18 from direct contact with the main body portion 4, contact between the surface 20 and the cutting blade will be solely due to the force exerted by the spring 28. Thus, positioning of the cutting blade may be easily and controllably carried out.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A clamping screw comprising:
    a main body portion being generally cylindrical in shape and having a length extending between a first end and a second end and an axis of rotation extending in the direction of said length, said main body portion further comprising an outer surface having threads arranged along at least a portion of said length and an inner bore defining an opening at the second end of said main body portion,
    a head portion comprising a contacting surface, said head portion being positioned adjacent said second end of said main body portion and being axially movable relative to said main body portion,
    resilient means for providing a force to urge said head portion away from said main body portion in an axial direction wherein said resilient means extends into a bore formed in said head portion.

2. The clamping screw of claim 1 wherein said resilient means is positioned in said inner bore.

3. The clamping screw of claim 1 wherein said resilient means comprises a spring.

4. The clamping screw of claim 1 wherein said resilient means comprises a spring positioned in said inner bore and extending into a bore formed in said head portion.

5. The clamping screw of claim 1 wherein said outer surface proximate said second end of said main body portion is smooth and slidably engaged with an inner surface of said bore of said head portion.

6. The clamping screw of claim 5 wherein said outer surface proximate said second end comprises a diameter less than the diameter of said outer surface comprising threads.

7. A clamping screw comprising:
    a main body portion being generally cylindrical in shape and having a length extending between a first end and a second end and an axis of rotation extending in the direction of said length, said main body portion further comprising an outer surface and an inner bore extending along said length, said outer surface comprising threads arranged along at least a portion of said length, said inner bore defining a first opening at the first end of said main body portion and a second opening at the second end of said main body portion,
    a clamping head comprising a contacting surface, said clamping head being positioned adjacent said second end of said main body portion and being axially movable relative to said main body portion between a compressed position and an extended position,
    a plunger releasably secured to said clamping head, said plunger being axially movable within said inner bore and through said second end between a compressed position and an extended position,
    resilient means engaging said plunger and providing a force to urge said plunger and clamping head away from said main body portion in an axial direction toward said extended position, and,
    stop means located within said inner bore at a location between said first end and said second end, said stop means providing a stationary contact surface for engagement by said resilient means.

8. The clamping screw of claim 7 wherein said clamping head includes an inner end opposite said contact surface, said inner end comprising an opening into which said plunger is releasably secured.

9. The clamping screw of claim 9 wherein said clamping head opening is a threaded opening.

10. The clamping screw of claim 7 wherein said plunger is generally cylindrical in shape and comprises a first end and a second end, said first end having a flanged outer rim and comprising an opening extending axially into said plunger, said opening terminating at a location axially inward of said second end.

11. The clamping screw of claim 10 wherein said plunger further includes a threaded outer surface adjacent said second end.

12. The clamping screw of claim 11 wherein said threaded outer surface of said plunger releasably engages a threaded opening at an inner end opposite said contact surface of said clamping head.

13. The clamping screw of claim 10 wherein said resilient means comprises a spring having a first end and a second end, said first end of said spring engaging said stop means and said second end of said spring being positioned in the axial opening of said plunger and in contact with the axially inward location.

14. The clamping screw of claim 7 wherein said stop means is positioned axially inward of said first end and wherein the portion of said inner bore between said first end and said stop means comprises a drive socket for accepting a tool for advancing or retracting said clamping screw.

15. The clamping screw of claim 7 wherein said stop means comprises a press-fit plug or setscrew.

16. The clamping screw of claim 10 wherein in the extended position, the flanged outer rim of said plunger engages a shoulder formed by a narrowing of said inner bore.

* * * * *